United States Patent Office 2,929,728
Patented Mar. 22, 1960

2,929,728
CERAMIC GLAZE

Robert W. Foraker, Westfield, N.J., assignor to National Lead Company, New York, N.Y., a corporation of New Jersey No Drawing. Application September 5, 1957
Serial No. 682,085

5 Claims. (Cl. 106—54)

This invention relates to a ceramic glaze. More specifically, this invention relates to a white-opacified ceramic glaze, opacified and whitened with $TiO_2$. In particular, this invention relates especially to a self-opacified titania-containing glaze of the alkali boroalumino-silicate type.

This application is a continuation-in-part of my application Serial No. 500,697, filed April 11, 1955, now abandoned.

To be useful in the coating of ceramic bodies a glaze must exhibit certain properties. It is necessary, first of all, that the glaze have a coefficient of thermal expansion similar to that of the substrate ceramic material; otherwise undue stresses will be set up during the cooling of the fired piece resulting in spalling, cracking, chipping or crazing. Aside from the necessary limitations on the coefficient of expansion, other properties are desirable in a decorative glaze. Among these may be mentioned high opacity, gloss, durability at a low maturing temperature, and purity of color. Particularly in the case of a white glaze, a pure white color is to be desired. Such a base color lends itself readily to the production, if desired, of pastel shades by the addition of minor amounts of tinting agents to the formulation.

Ceramic glazes designed to provide the above desirable properties and overcome the disadvantages of the prior art have been described in co-pending application Serial No. 381,959, filed September 23, 1953, now abandoned, and assigned to the assignee hereof. These glazes, however, while successful in achieving the objects for which they were designed, suffered from certain disadvantages. In particular, it was found that a relatively high proportion of $Al_2O_3$ was required in the formulation to promote optimum crystallization of the titania and thereby give good opacification. This high proportion of $Al_2O_3$, however, resulted in relatively high melting point compositions so that the frit batches could not be smelted without resorting to higher temperatures than might be desired for many applications.

It is, therefore, an object of the present invention to provide an improved ceramic frit composition capable of forming a glaze upon firing. It is a further object to provide a ceramic glaze having a coefficient of expansion similar to ceramic wall tile. Still another object is to provide a durable, white opaque ceramic glaze having a relatively low maturing temperature. An additional object is to provide a frit composition which may be smelted at a relatively low temperature to produce a frit capable of being fired to provide a durable, white opaque glaze of the recrystallizing type. Other objects and advantages will become apparent from the following more complete description and claims.

Broadly, this invention contemplates a ceramic frit composition capable of forming a glaze upon firing, comprising $SiO_2$ in amount from 55 to 70%, $B_2O_3$ in amount from 7 to 15%, $Al_2O_3$ in amount from 1 to 5%, $TiO_2$ in amount from 7 to 15%, $ZrO_2$ in amount from 0 to 3%, an alkali selected from the group consisting of $K_2O$ and $Na_2O$ in amount from 10% to 15%, and MgO in amount from 0 to 5%, the sum of the $Al_2O_3$, $ZrO_2$ and MgO being from 3 to 10%, all of the above percentages being mole percentages.

ZnO may also be added to the above glaze composition in amount of about one mole percent. The addition of ZnO tends to improve the gloss of the resultant glaze and produces a somewhat smoother surface.

In a particularly desirable embodiment this invention contemplates a glaze of the above type which further comprises from 1 to 3% $P_2O_5$.

In another particularly desirable embodiment this invention contemplates a glaze of the above type which further comprises from 1 to 5% $F_2$.

To insure that the frit composition will smelt at a relatively low temperature, it is important that the $Al_2O_3$ be no higher than about 5%. As disclosed in the above-mentioned co-pending application, such low proportions of $Al_2O_3$ would ordinarily be expected to result in poor crystallization of the $TiO_2$ during the final firing operation, with consequent loss of whiteness and opacification. It has been found, however, that a sufficient degree of whitness and opacity is achieved even using relatively low percentages of $Al_2O_3$, providing the sum of the $Al_2O_3$, the $ZrO_2$, and MgO (if present) is kept within the range 3 to 10%. As stated above, the opacifier is $TiO_2$, and should be present in amount from 7 to 15 mole percent.

Throughout the above discussion and elsewhere herein, except as otherwise stated, the percentages discussed are mole percentages based on the sum of the oxides present.

A ceramic glaze having a composition as just described may be applied to wall tile and other common clay ceramic materials such as whiteware bodies, terra cotta, earthenware and structural clay bodies which mature at temperatures in the neighborhood of 1500° F. to 2000° F. to produce a highly opaque white glaze. The glaze is of the "recrystallizing" type, by which is meant that it is pigmented by precipitation during the maturing heat of titania or zirconia originally present as a melted-in constituent of the frit. It may be applied by using a frit having a composition within the ranges above specified and prepared by fusing the batch to provide complete intersolution, quenching in water and milling. It has been found that frit batches corresponding to the oxide mole percentages given above may, in general, be satisfactorily smelted at temperatures below 2400° F.

In order to illustrate more fully the methods of preparation and application of ceramic glazes according to this invention, the following examples are presented:

Example 1

A frit batch was prepared by mixing the following ingredients:

| | Parts by weight |
|---|---|
| $SiO_2$ | 140.9 |
| $Na_2B_4O_7$ | 39.6 |
| $Al_2O_3$ | 11.2 |
| $Na_2CO_3$ | 21.2 |
| $NaNO_3$ | 27.2 |
| $TiO_2$ | 48.0 |

After thorough mixing the mixture was smelted for 1¼ hours at 2400° F. and quenched in water. A clear frit was produced which had the following oxide composition:

| | Mole Percent | Weight Percent |
|---|---|---|
| $SiO_2$ | 58.6 | 55.8 |
| $B_2O_3$ | 9.7 | 9.9 |
| $Al_2O_3$ | 2.8 | 4.1 |
| $Na_2O$ | 13.9 | 12.6 |
| $TiO_2$ | 15.0 | 17.6 |

One hundred parts of the frit were mixed with 28.4 parts of china clay, 0.25 part of KCl, 0.25 part of $NaAlO_2$ and 55 parts of water. The mixture was made into a slip by grinding in a ball mill and screening through an 80 mesh screen to remove the coarse particles.

The slip was then sprayed onto an architectural tile at the dry weight of 30 grams per square foot and the tile containing the sprayed slip was dried and then heated at 250° F. per hour to 2000° F. and held for 30 minutes to mature the glaze on the tile. The matured glaze was allowed to cool to room temperature over a period of 16 hours. The resulting glazed tile exhibited a white color with good surface texture and with no detectable tendency to craze, chip or spall.

This particular example represents the best method for preparing the glaze of the instant invention.

Example 2

Another batch was prepared using the following ingredients:

| | Parts by weight |
|---|---|
| $SiO_2$ | 146.0 |
| $Na_2B_4O_7$ | 51.6 |
| $Al_2O_3$ | 9.8 |
| $Na_2CO_3$ | 13.8 |
| $ZrO_2 \cdot SiO_2$ | 14.6 |
| $TiO_2$ | 26.9 |

The batch was thoroughly mixed and smelted for one hour at 2350° F. and quenched in water to produce a frit having the following oxide composition:

| | Mole Percent | Weight Percent |
|---|---|---|
| $SiO_2$ | 63.8 | 58.5 |
| $B_2O_3$ | 13.1 | 13.9 |
| $Al_2O_3$ | 2.4 | 3.7 |
| $Na_2O$ | 10.2 | 9.7 |
| $ZrO_2$ | 2.0 | 3.8 |
| $TiO_2$ | 8.5 | 10.4 |
| | 100.0 | 100.0 |

The quenched frit was then ball-milled with the same mill additions and in the same manner as that described in Example 1, applied to a similar tile body at the same weight and heated at 300° F./hr. to a temperature of 1700° F. and held at 1700° F. for one hour and then permitted to cool to room temperature. The resulting glaze was white with a slight yellow undertone and showed excellent gloss, texture and acid resistance, with good opacity and no discernible tendency to craze or spall.

Example 3

The procedure of Example 1 was again repeated, substituting the following batch composition:

| | Parts by weight |
|---|---|
| $SiO_2$ | 140.0 |
| $Na_2B_4O_7$ | 37.8 |
| $Na_2CO_3$ | 14.8 |
| $NaNO_3$ | 20.4 |
| $Al_2O_3$ | 11.0 |
| $ZrO_2 \cdot SiO_2$ | 16.8 |
| $MgCO_3$ | 11.5 |
| $ZnO$ | 3.2 |
| $TiO_2$ | 30.1 |

The batch was mixed and smelted at 2350° F. for one hour. The melt was fairly viscous at this temperature, but still sufficiently fluid to be handled and poured without undue difficulty or losses. The melt was quenched as above described to produce a frit having the following oxide composition:

| | Mole Percent | Weight Percent |
|---|---|---|
| $SiO_2$ | 60.6 | 55.9 |
| $B_2O_3$ | 9.4 | 10.1 |
| $Al_2O_3$ | 2.7 | 4.2 |
| $Na_2O$ | 11.2 | 10.7 |
| $MgO$ | 3.4 | 2.1 |
| $ZrO_2$ | 2.3 | 4.3 |
| $ZnO$ | 1.0 | 1.2 |
| $TiO_2$ | 9.4 | 11.5 |
| | 100.0 | 100.0 |

This frit was ball-milled, screened and applied to a tile body by the same procedure used in Example 1 and then heated at a rate of 250° F. per hour to 1700° F. and held for 1 hour, and allowed to cool in the kiln overnight. The resulting glaze was similar in color to that described in Example 2, and was also of good quality with respect to gloss, texture, acid and alkali resistance, and freedom from crazing and cracking.

Example 4

A frit batch was prepared by mixing the following ingredients:

| | Parts by weight |
|---|---|
| $SiO_2$ | 149.0 |
| $Na_2B_4O_7$ | 38.7 |
| $Na_2CO_3$ | 14.0 |
| $NaNO_3$ | 22.4 |
| $Al_2O_3$ | 21.2 |
| $MgCO_3$ | 5.0 |
| $ZnO$ | 3.4 |
| $TiO_2$ | 31.0 |

The batch was mixed well and smelted for one hour at 2350° F. and quenched in water. A clear frit was produced which had the following oxide composition:

| | Mole Percent | Weight Percent |
|---|---|---|
| $SiO_2$ | 61.8 | 57.0 |
| $B_2O_3$ | 9.6 | 10.3 |
| $Al_2O_3$ | 5.1 | 8.0 |
| $Na_2O$ | 11.4 | 10.8 |
| $MgO$ | 1.5 | 0.9 |
| $ZnO$ | 1.0 | 1.2 |
| $TiO_2$ | 9.6 | 11.8 |
| | 100.0 | 100.0 |

The frit was then milled, screened and sprayed onto 3 tile bodies in the same manner as that described in Example 1.

The 3 pieces were then matured respectively at 1600, 1700 and 1800° F. for ½ hour in each case, and cooled overnight to room temperature. All three of the resulting glazed tiles exhibited a substantially identical excellent white color, with good surface texture and no detectable tendency to craze, chip or spall.

Example 5

The procedure of Example 1 was again repeated substituting the following batch composition:

| | Parts by weight |
|---|---|
| $SiO_2$ | 142.0 |
| $Na_2B_4O_7$ | 37.8 |
| $Al_2O_3$ | 20.4 |
| $Na_2CO_3$ | 11.4 |
| $NaNO_3$ | 18.4 |
| $Na_2SiF_6$ | 7.5 |
| $MgCO_3$ | 5.0 |
| $ZnO$ | 3.3 |
| $TiO_2$ | 29.7 |

The batch was mixed well and smelted for one hour at 2400° F. and cooled. A frit was produced which had the following oxide composition:

|  | Mole Percent | Weight Percent |
|---|---|---|
| $SiO_2$ | 60.0 | 55.9 |
| $B_2O_3$ | 9.3 | 10.1 |
| $Al_2O_3$ | 5.0 | 7.9 |
| $Na_2O$ | 11.1 | 10.7 |
| $MgO$ | 1.5 | 0.9 |
| $ZnO$ | 1.0 | 1.3 |
| $F_2$ | 2.8 | 1.7 |
| $TiO_2$ | 9.3 | 11.5 |
|  | 100.0 | 100.0 |

The frit was then made into a slip using the same procedure as that described in Example 1. The slip was sprayed at the same weight on tile bodies and the temperature was raised at the rate of 250° F. per hour to the maturing temperature of 1700° C. for one-half hour. The resulting glaze had an excellent color and texture with good opacity and no tendency to craze or spall.

*Example 6*

A frit batch was prepared according to the procedure of Example 1 except the following ingredients were employed:

| | Parts by weight |
|---|---|
| $SiO_2$ | 146.2 |
| $Na_2B_4O_7$ | 39.5 |
| $Na_2CO_3$ | 14.8 |
| $NaNO_3$ | 20.4 |
| $Al_2O_3$ | 11.8 |
| $ZrO_2+SiO_2$ | 16.8 |
| $MgCO_3$ | 5.0 |
| $ZnO$ | 3.2 |
| $TiO_2$ | 24.7 |

The batch after being thoroughly mixed was smelted for one hour at 2350° F. and then quenched in water. The frit produced had the following oxide composition:

|  | Mole Percent | Weight Percent |
|---|---|---|
| $SiO_2$ | 63.2 | 58.1 |
| $B_2O_3$ | 9.8 | 10.5 |
| $Al_2O_3$ | 2.9 | 4.5 |
| $Na_2O$ | 11.6 | 11.0 |
| $MgO$ | 1.5 | 0.9 |
| $ZrO_2$ | 2.3 | 4.3 |
| $ZnO$ | 1.0 | 1.3 |
| $TiO_2$ | 7.7 | 9.4 |
|  | 100.0 | 100.0 |

A slip was prepared from the frit using the procedure described in Example E and the slip was sprayed at the same weight on three tile bodies and the temperature was raised at the rate of 325° F. per hour to the maturing temperature. The three pieces were matured respectively at 1600° F., 1700 F. and 1800° F. for ½ hour. All of these possessed a good color and texture and possessed no detectable tendency to craze or spall.

*Example 7*

Another frit batch was prepared according to the procedure of Example 1 except the following ingredients were employed:

| | Parts by weight |
|---|---|
| $SiO_2$ | 148.0 |
| $Na_2B_4O_7$ | 39.5 |
| $Al_2O_3$ | 11.4 |
| $NH_4H_2PO_4$ | 13.8 |
| $Na_2CO_3$ | 25.7 |
| $ZrO_2 \cdot SiO_2$ | 16.9 |
| $TiO_2$ | 31.0 |

The batch was thoroughly mixed and smelted for one hour at 2350° F. and quenched in water. The frit produced had the following oxide analysis:

|  | Mole Percent | Weight Percent |
|---|---|---|
| $SiO_2$ | 62.8 | 56.4 |
| $B_2O_3$ | 9.6 | 10.0 |
| $Al_2O_3$ | 2.8 | 4.3 |
| $Na_2O$ | 11.4 | 10.5 |
| $P_2O_5$ | 1.5 | 3.2 |
| $ZrO_2$ | 2.3 | 4.2 |
| $TiO_2$ | 9.6 | 11.4 |
|  | 100.0 | 100.0 |

A slip was prepared from the frit using the procedure described in Example 1 and the slip was sprayed at the same weight on three tile bodies and the temperature was raised at the rate of 325° F. per hour to the maturing temperature. The three pieces were matured respectively at 1600° F., 1700° F. and 1800° F. for ½ hour. All of these possessed a good color and texture and possessed no detectable tendency to craze or spall.

From the above description and by the examples shown, ceramic glazes possessing relatively low smelting and maturing temperatures have been produced using small proportions of aluminum oxide. The ceramic glazes produced by the instant invention have low coefficients of expansion and satisfactory viscosity characteristics at relatively low maturing temperatures.

The ceramic glazes of the instant invention are durable and possess good color and surface texture.

While this invention has been described and illustrated by the examples shown, it is not intended to be strictly limited thereto, and other variations and modifications may be employed within the scope of the following claims.

I claim:

1. A frit composition of the self-opacifying alkali boro-aluminosilicate type consisting essentially of $SiO_2$ in amount from about 55 to about 70 mole percent, $B_2O_3$ in amount from about 7 to about 15 mole percent, $Al_2O_3$ in amount from about 1 to about 5 mole percent, $TiO_2$ in amount from about 7 to about 15 mole percent, $ZrO_2$ in amount from 0 to about 3 mole percent, an alkali metal oxide selected from the group consisting of $K_2O$ and $Na_2O$ in amount from about 10 to about 15 mole percent, and $MgO$ in amount from 0 to about 5 mole percent, the sum of the $Al_2O_3$, $ZrO_2$ and $MgO$ being from about 3 to about 10 mole percent.

2. An opacified glaze composition of the self-opacifying type consisting essentially of $SiO_2$ in amount from about 55 to about 70 mole percent, $B_2O_3$ in amount from about 7 to about 15 mole percent, $Al_2O_3$ in amount from about 1 to about 5 mole percent, $TiO_2$ in amount from about 7 to about 15 mole percent, $ZrO_2$ in amount from 0 to about 3 mole percent, an alkali metal oxide selected from the group consisting of $K_2O$ and $Na_2O$ in amount from about 10 to about 15 mole percent, and $MgO$ in amount from 0 to about 5 mole percent, the sum of the $Al_2O_3$, $ZrO_2$ and $MgO$ being from about 3 to about 10 mole percent.

3. The composition according to claim 2 in which said glaze further contains from about 1 to about 3 mole percent of $P_2O_5$.

4. The composition according to claim 2 in which the said glaze further contains from about 1 to about 5 mole percent $F_2$.

5. The composition according to claim 2 in which the said glaze further contains about 1 mole percent ZnO.

References Cited in the file of this patent

UNITED STATES PATENTS

| Re.23,049 | Armistead | Nov. 23, 1948 |
| 1,948,461 | Kreidl | Feb. 20, 1934 |
| 2,093,194 | Geppert | Sept. 14, 1937 |
| 2,688,560 | Armistead | Sept. 7, 1954 |
| 2,748,006 | Kreidl et al. | May 29, 1956 |
| 2,799,590 | Armistead | July 16, 1957 |